US008396230B2

(12) United States Patent
Chang et al.

(10) Patent No.: US 8,396,230 B2
(45) Date of Patent: Mar. 12, 2013

(54) SPEECH ENHANCEMENT DEVICE AND METHOD FOR THE SAME

(75) Inventors: Jung Kuei Chang, Hsinchu Hsien (TW); Dau Ning Guo, Hsinchu Hsien (TW); Shang Yi Huang, Hsinchu Hsien (TW); Huang Hsiang Lin, Hsinchu Hsien (TW); Shao Shi Chen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 1169 days.

(21) Appl. No.: 12/260,319

(22) Filed: Oct. 29, 2008

(65) Prior Publication Data

US 2009/0182555 A1 Jul. 16, 2009

(30) Foreign Application Priority Data

Jan. 16, 2008 (TW) .............................. 97101673 A

(51) Int. Cl.
*H04B 15/00* (2006.01)

(52) U.S. Cl. ...... 381/94.3; 381/22; 381/92; 379/406.03; 379/406.06; 704/226; 704/204; 704/500

(58) Field of Classification Search .......... 704/226–230, 704/500–504, 200.1, 219, 204, 225, 278, 704/233; 381/94.3, 92, 22, 316; 379/406.03, 379/406.06

See application file for complete search history.

(56) References Cited

U.S. PATENT DOCUMENTS

| | | | | | |
|---|---|---|---|---|---|
| 5,245,667 | A | * | 9/1993 | Lew | 381/94.4 |
| 5,815,580 | A | * | 9/1998 | Craven et al. | 381/58 |
| 5,969,654 | A | * | 10/1999 | Goldin | 341/141 |
| 6,108,626 | A | * | 8/2000 | Cellario et al. | 704/230 |
| 6,256,608 | B1 | * | 7/2001 | Malvar | 704/230 |
| 6,356,871 | B1 | * | 3/2002 | Hemkumar et al. | 704/500 |
| 6,542,094 | B1 | * | 4/2003 | Venkitachalam et al. | 341/61 |
| 6,683,927 | B1 | * | 1/2004 | Ito | 375/355 |
| 6,760,451 | B1 | * | 7/2004 | Craven et al. | 381/98 |
| 6,882,971 | B2 | * | 4/2005 | Craner | 704/246 |
| 7,742,609 | B2 | * | 6/2010 | Yeakel et al. | 381/119 |
| 2004/0013262 | A1 | * | 1/2004 | Henry | 379/368 |
| 2009/0296954 | A1 | * | 12/2009 | Hooley et al. | 381/80 |

FOREIGN PATENT DOCUMENTS

| | | | |
|---|---|---|---|
| CN | 1275301 | A | 11/2000 |
| CN | 1477900 | A | 2/2004 |
| CN | 1941073 | A | 4/2007 |
| CN | 1942017 | A | 4/2007 |

* cited by examiner

*Primary Examiner* — Vijay B Chawan
(74) *Attorney, Agent, or Firm* — Edell, Shapiro & Finnan, LLC

(57) ABSTRACT

A speech enhancement device and a method for the same are included. The device includes a down-converter, a speech enhancement processor, and an up-converter. The method includes steps of down-converting audio signals to generate down-converted audio signals; performing speech enhancement on the down-converted audio signals to generate speech-enhanced audio signals; and up-converting the speech enhancement audio signals to generate up-converted audio signals.

12 Claims, 8 Drawing Sheets

SPEECH ENHANCEMENT DEVICE AND METHOD FOR THE SAME

FIELD OF THE INVENTION

The present invention relates to a speech enhancement device and a method for the same, and more particularly, to a speech enhancement device and a method for the same with respect to human voice among audio signals using speech enhancement and associated signal processing techniques.

BACKGROUND OF THE INVENTION

In ordinary audio processing applications of common audio output interfaces, such as audio output from the speaker of televisions, computers, mobile phones, telephones or microphones, the audio output contains the waveforms distributed in different frequency bands. The varied sounds chiefly include human voice, background sounds and noise, and other miscellaneous sounds. To alter acoustic effects of certain sounds, or to emphasize importance of certain sounds, advanced audio processing on the certain sounds is required.

To be more precise, human speech contents in need of emphasis among output sounds are particularly enhanced. For instance, by enhancing frequency bands of dialogues between leading characters in a movie or of human speech in telephone conversations, output results of the enhanced frequency bands become more distinguishable and perspicuous against less important background sounds and noises, thereby accomplishing distinctive presentation as well as precise audio identification purposes, which are crucial issues in audio processing techniques.

The aforementioned human speech enhancement technique is already used and applied according to the prior art. Referring to FIG. 1 showing a waveform schematic diagram in which a specific band is enhanced according to the prior art, the upper waveform is an original sound output waveform, with a horizontal axis thereof representing frequency and a vertical axis thereof representing amplitude of the waveform output. The lower waveform in the diagram shows a processed waveform. In that ordinary human voices have a frequency range of between 500 Hz and 6 KHz or even 7 KHz, any sound frequencies falling outside this range is not the frequency range of ordinary human voices. As shown in the diagram, a common speech enhancement technique directly selects signals within a band of 1 KHz to 3 KHz from a band of output sounds, and processes the selected signals to generate output signals. Alternatively, a filter through a time domain is used to perform bandpass filtering and enhancement on signals of a certain band. According to such prior art, the desired band of human voice is indeed enhanced. However, co-existing background sounds and noises as well as minor audio contents are concurrently enhanced, such that the speech does not sound distinguishable or clear. Some existing digital and analog televisions implement the above method or a similar method for enhancing speech outputs.

FIG. 2 shows a schematic diagram of a system operation for speech enhancement according to the prior art. This technique processes audio signals of a single-channel under a frequency domain, and executes digital processing on a frequency sampling (FS) from the signals. Commonly used frequency sampling rate or sampling frequencies of audio signals include 44.1 KHz, 48 KHz and 32 KHz. The frequency domain signals are acquired from the time domain signals by using Fast Fourier Transform (FFT). Using a speech enhancement operator 10 in the diagram, various operations are performed on the sampling frequencies with specific resolutions under the frequency domain, so as to remove frequencies of non-primary background sounds and noises, or to enhance frequencies of required speech. With such procedure, the band of speech is accounted for a substantial ratio in output results obtained. The output results are processed using inverse FFT (IFFT) to return to the time domain signals for further audio output.

The abovementioned technique, including the speech enhancement operator 10, is prevailing in audio output functions of telephones and mobile phones, and is particularly extensively applied in GSM mobile phones. Processing modes or methods for this technique involve spectral subtraction, energy constrained signal subspace approaches, modified spectral subtraction, and linear prediction residual methods. Nevertheless, speech enhancement is still generally accomplished by individually processing left-channel and right-channel audio signals in common stereo sound outputs.

Although the method shown in FIG. 1 accomplishes speech enhancement without FFT and IFFT transformation, it has a drawback of unobvious and undistinguishable processed results, and fails to effectively fortify human speech or filter other minor sounds. The technique shown in FIG. 2, effectively using FFT, is capable of acquiring human speech or background sounds with respect to the sampling frequency of particular resolutions under the frequency domain, and performing corresponding human speech enhancement or background sounds filtering. Yet, when this technique is applied in processing left and right channels individually, the system inevitably requires a large amount of system memory such as DRAM or SRAM during operations thereof. In addition, after processing by the speech enhancement operator 10 under the frequency domain using FFT, IFFT is applied to return the time domain output signals. Performing FFT and IFFT transformation also requires a large amount of system memory and further requires extensive resources of a processor. Therefore, a primary object of the invention is to overcome the aforementioned drawbacks of the techniques of the prior art.

SUMMARY OF THE INVENTION

A primary object of the invention is to provide a speech enhancement device and a method for the same, which, by adopting prior speech enhancement techniques and associated signal mixing, low-pass filtering, down-conversion and up-conversion techniques, render distinct and clear enhancement effects on human speech bands in audio signals, and efficiently overcome drawbacks of operational inefficiencies (i.e., wastage) and memory resource depletion.

In one embodiment, a speech enhancement method for use in a speech enhancement device comprises steps of receiving audio signals having a first sampling frequency; down-converting the audio signals from the first sampling frequency to a second sampling frequency to generate down-converted audio signals, wherein the second sampling frequency is less than the first sampling frequency; performing speech enhancement on the down-converted audio signals to generate speech-enhanced audio signals; and up-converting the speech-enhanced audio signals from the second sampling frequency to the first sampling frequency to generate up-converted audio signals.

In another embodiment, a speech enhancement method for use in a speech enhancement device comprises steps of performing a first signal mixing process on left-channel audio signals with right-channel audio signals to generate audio signals; performing speech enhancement on the audio signals to generate speech-enhanced signals; and performing a second signal mixing process on the speech-enhanced signals with the left-channel audio signals to generate left-channel output audio signals and a third signal mixing process on the speech-enhanced signals with the right-channel audio signals to generate right-channel output audio signals.

In yet another embodiment, a speech enhancement device comprises a down-converter, for down-converting audio signals from a first sampling frequency to a second sampling frequency to generate down-converted audio signals, wherein the second sampling frequency is less than the first sampling frequency; a speech enhancement processor, coupled to the down-converter, for performing speech enhancement on the down-converted audio signals to generate speech-enhanced audio signals; and an up-converter, coupled to the speech enhancement processor, for up-converting the speech-enhanced audio signals to generate up-converted audio signals having a sampling frequency as the first sampling frequency.

In still another embodiment, a speech enhancement device comprises a first mixer, for performing a first signal mixing process on left-channel audio signals with right-channel audio signals to generate audio signals; a speech enhancement processor, coupled to the first mixer for performing speech enhancement on the audio signals to generate speech-enhanced audio signals; a second mixer coupled to the speech enhancement processor for performing a second signal mixing process on the audio signals with the left-channel audio signals to generate right-channel output signals; and a third mixer, coupled to the speech enhancement processor for performing a third signal mixing process on the audio signals with the right-channel audio signals to generate right-channel output signals.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

As previously mentioned, according to the prior art, speech enhancement techniques are already used and applied in devices and equipments having audio play functions including televisions, computers and mobile phones. An object of the invention is to overcome drawbacks of efficiency wastage and memory resource depletion resulting from speech enhancement operations of the prior art. In addition, the invention continues in using existing speech enhancement functions of the prior speech enhancement techniques. That is, a speech enhancement module or a speech enhancement processor, which performs enhancement or subtraction on a specific band within a channel by means of Fourier transform operations, is implemented. Thus, not only do the enhanced speech becomes perspicuous against background sounds and noises, but the drawbacks of significant processor resource consumption and memory resource depletion occurring in prior art are also effectively reduced.

Figure 1:
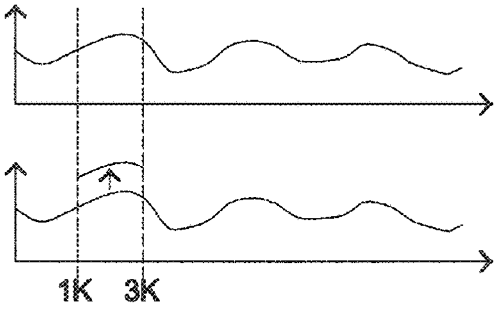
FIG.1 (Prior Art)
FIG. 1 shows a schematic diagram of the prior art for enhancing a specific band.
Figure 2:
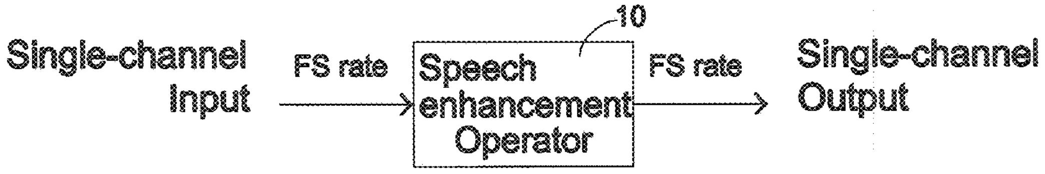
FIG.2 (Prior Art)
FIG. 2 shows a schematic diagram of a system operation for speech enhancement according to the prior art.
Figure 3:
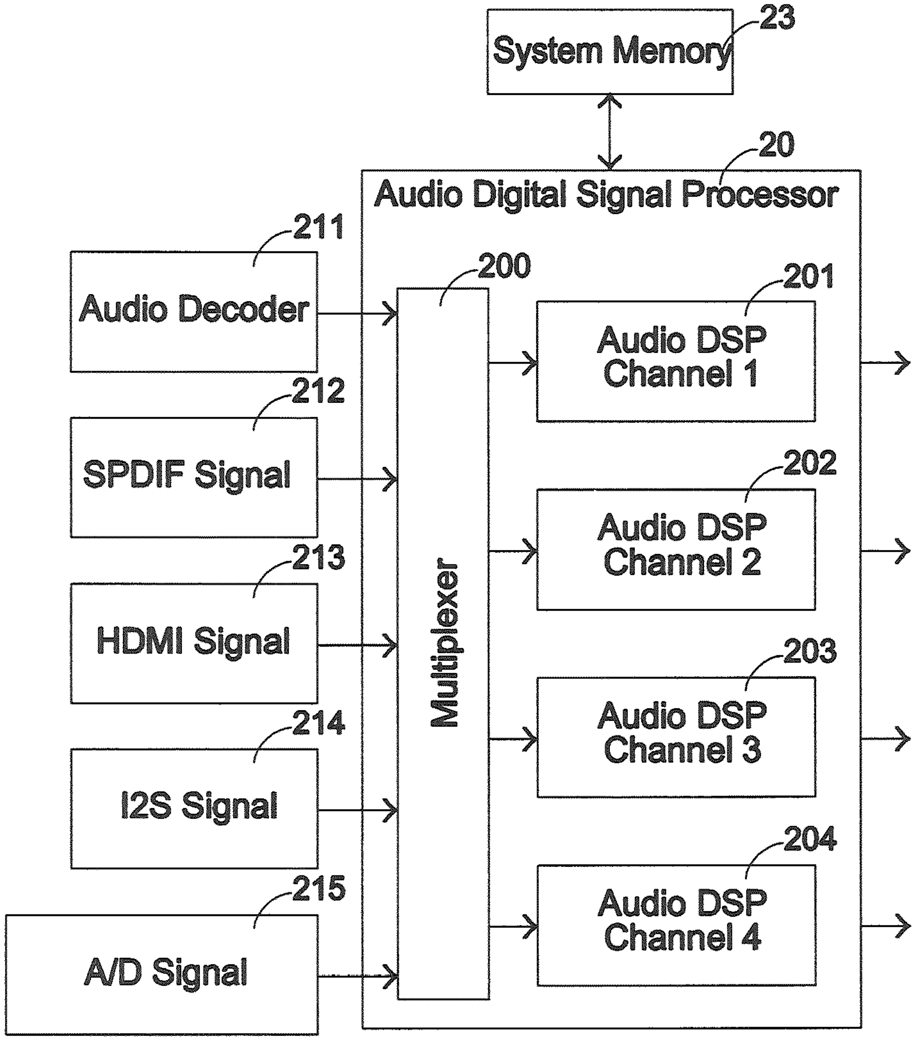
FIG. 3 shows a schematic diagram of a multimedia device having processing functions for various sound effects.

FIG. 3 is a schematic diagram of a multimedia playing device having various sound effect processing functions. The multimedia device may be a digital television. Through a menu on an associated user interface or an on-screen display, a user may control and set preferences associated with sound effects. The device primarily adopts an audio digital signal processor 20 for processing various types of audio signals. Types and numbers of audio signals that may be input into the processor 20 are dependent on processing capability of the processor 20. As shown in the diagram, signals 211 to 215 may include a signal input from an audio decoder, a SONY/Philips Digital Interface (SPDIF) signal, a High-Definition Multimedia Interface (HDMI) signal, an Inter-IC Sound (I2C) signal, and analog-digital-change signal. In addition, a system memory 23 provides operational memory resources.

The foregoing signals may be digital signals or analog signals converted into digital formats before being input, and are sent into a plurality of audio digital processing sound effect channels 201 to 204 for processing and outputting. The plurality of sound effect channels may have processing functions of volume control, bass adjustment, treble adjustment, surround and superior voice. By controlling or adjusting the menu, a user can activate corresponding sound effect processing functions. Similarly, the number of the sound effect channels is determined by processing functions handled by the processor 20.

The speech enhancement method according to the invention may be applied to the aforementioned multimedia devices. That is, the method and application according to the invention enhance operations of a specific channel, which provides superior voice function and is a speech enhancement channel among the aforementioned plurality of audio digital processing sound effect channels. Thus, distinct and perspicuous speech output is obtained when a user activates the sound effect channel corresponding to the speech enhancement method according to the invention.

Figure 4:
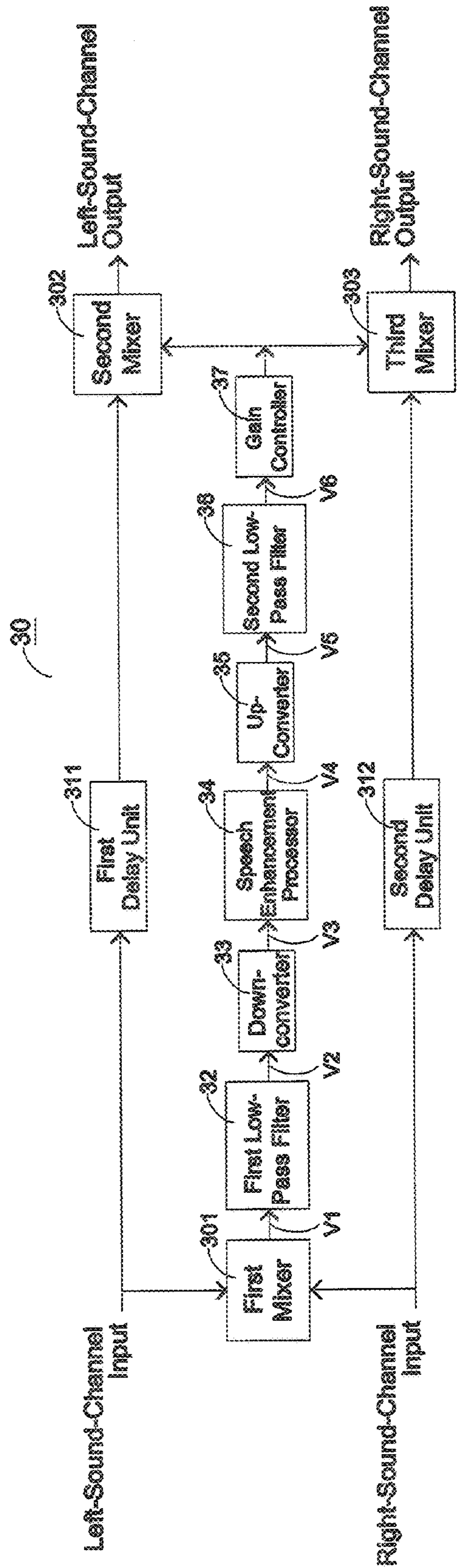
FIG. 4 shows a schematic diagram of a speech enhancement processor according to the invention.

FIG. 4 is a schematic diagram of a speech enhancement device 30 according to one preferred embodiment of the invention. As described above, a speech enhancement device 30 may be applied in one particular channel associated with speech enhancement among the plurality of sound effect channels and a corresponding input structure, with audio signals processed by the speech enhancement device 30 according to the invention being output from the structure shown in FIG. 3. Referring to FIG. 4, the speech enhancement device 30 comprises three mixers 301 to 303, two delay units 311 and 312, two low-pass filters 32 and 36, a down-converter 33, a speech enhancement processor 34, and an up-converter 35. Electrical connection relations between the various components are indicated in the diagram.

The left-channel and right-channel audio signals may be input signals transmitted individually and simultaneously into the speech enhancement device 30 by left and right channels among the signal inputs 211 to 215. The first mixer 301 performs first signal mixing on a left-channel audio signal with a right-channel audio signal to generate a first audio signal V1. The audio signal V1 is a target on which the invention performs speech enhancement.

Compared to the prior art that respectively processes audio signals input from a single channel to left and right channels, the invention reduces the demand of system memory 23 to a half. In the prior art, for operations of the left and right channels, it is necessary that the system memory 23 (DRAM or SRAM) designates a section of memory space for operations of the two signals, respectively. In addition, the processor 20 also needs to allocate computing resources to the left-channel and right-channel audio signals, respectively. However, according to the present invention, only the audio signal V1 needs to be processed. Also, having undergone the first signal mixing, the audio signal V1 from a sum of the right-channel audio signal and the left-channel audio signal and then divided by two, contains complete signal contents after being mixed. Therefore, not only the demand of system memory 23 but also computing resources required by the processor 20 is half of that of the prior art, thereby effectively overcoming drawbacks of the prior art.

Down-conversion as a step in the speech enhancement procedure is to be performed. Without undesirably influencing output results, the down-conversion is performed by reducing the sampling frequency. Thus, the down-converted band still contains most energy of speech to maintain quality of speech. In addition, algorithmic operations are decreased to substantially reduce memory resource depletion and processor resource wastage. An embodiment shall be described below.

Figure 5:
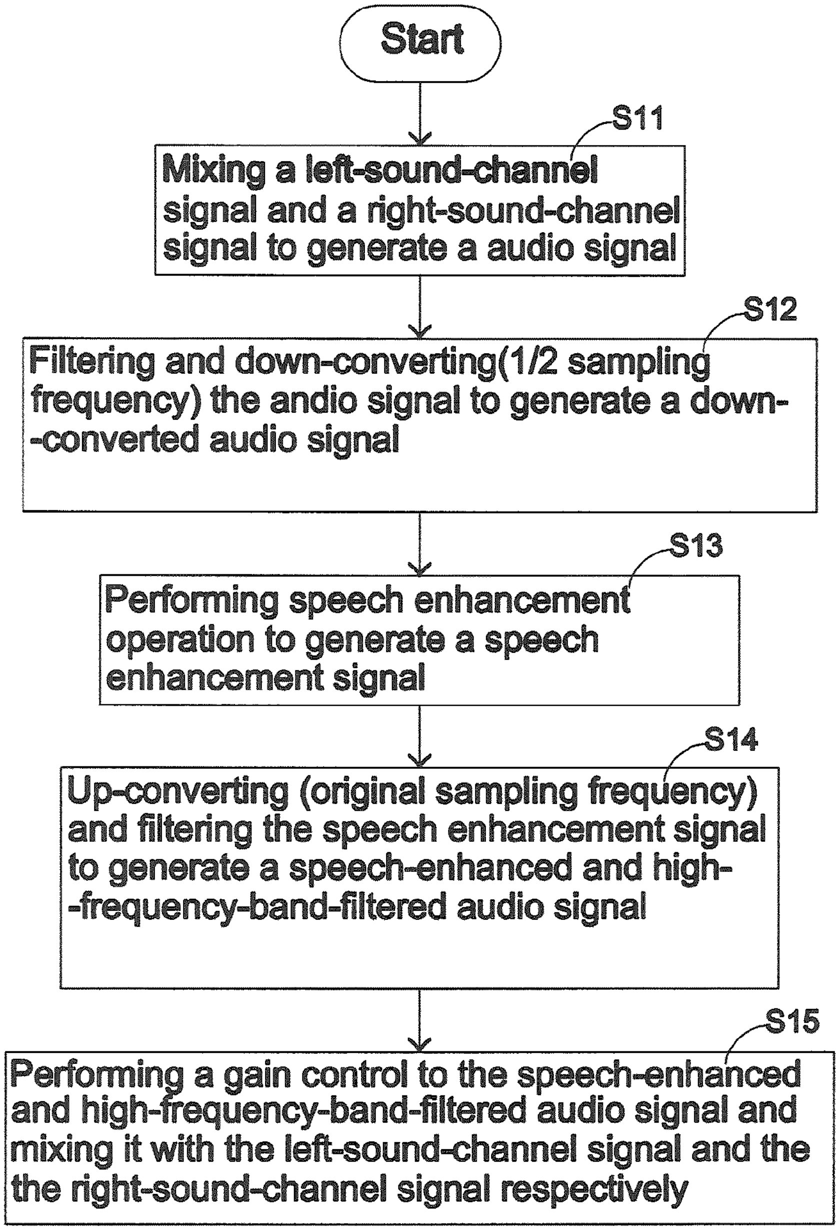
FIG. 5 shows a flow chart according to a first preferred embodiment of the invention.

FIG. 5 shows a flow chart according to a first preferred embodiment of the invention. Step S11 is a process of the aforementioned first signal mixing. When inputting the left-channel and right-channel audio signals, a frequency sampling (FS) rate thereof or a so-called sampling frequency thereof is a first sampling frequency. According to the prior art, the FS rate with respect to speech enhancement may be 44.1 KHz, 48 KHz or 32 KHz, whereas the audio signal V1 generated therefrom also has the first sampling frequency. In this embodiment, it is designed that the left-channel and right-channel audio signals and the audio signal V1 have the first sampling frequency, as well as having n samples of sampling frequency within a unit time.

Step S12 is a down-converting process according to the invention. The audio signal V1 is first processed by low-pass filtering followed by down-conversion. In this embodiment, a first low-pass filter 32 is adopted for performing first low-pass filtering on the audio signal V1 to generate a high-frequency-band-filtered audio signal V2. It is to be noted that high frequency bands of the audio signal V1 are filtered without changing the frequency sampling frequency thereof. Therefore, the high-frequency-band-filtered audio signal V2 maintains n samples within a unit time.

Figure 6:
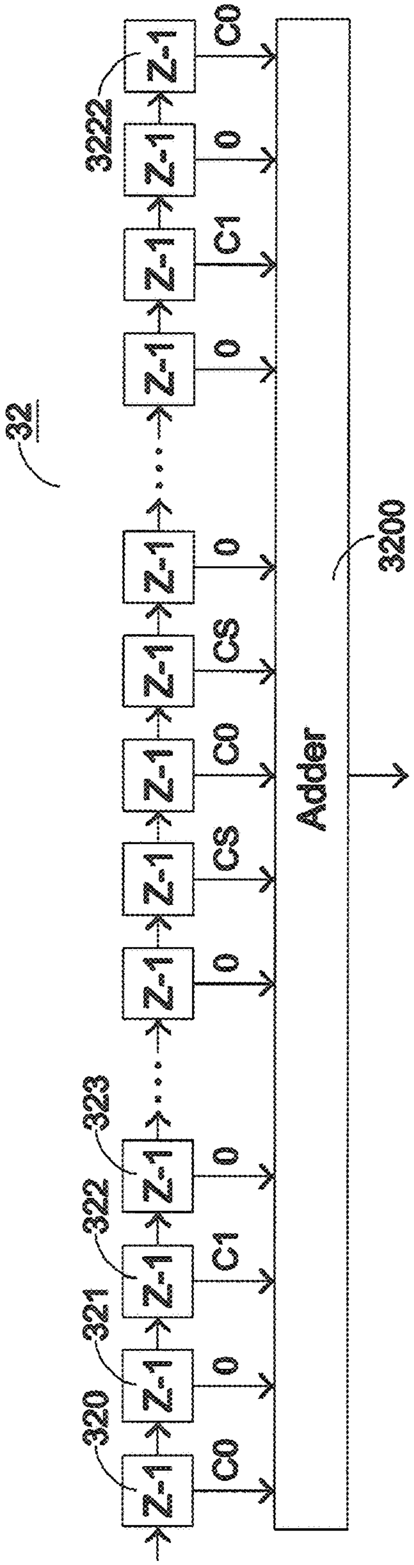
FIG. 6 shows a schematic diagram of an FIR half-band filter.

Next, a down-converter 33 is used for down-converting the high-frequency-band-filtered audio signal V2 and reducing the n samples to n/2 samples within a unit time, so as to generate a down-converted audio signal V3. For example, in this preferred embodiment, the sampling frequency to be processed is reduced to a half of the original sampling frequency. A half-band filter is adopted as the first low-pass filter 32, which prevents high frequency alias from affecting the down-converting process of reducing the sampling frequency to a half. FIG. 6 shows a schematic diagram of a half-band filter as the first low-pass filter 32. The first low-pass filter 32 comprises 23 delay units 320 to 3222, and an adder 3200. To effectively reduce complex calculation, the coefficients of half of the delayers 320 to 3222 are set to be zero; that is, every other delayer has a coefficient of zero. Products of the coefficients of the 23 delay units are added to obtain a sum as an outcome of the low-pass filter.

Referring again to the flow chart of FIG. 5, at step S12, the down-converter 33 is used for down-converting the high-frequency-band-filtered audio signal V2 to reduce the sampling frequency to a half, so as to generate the down-converted audio signal V3 having a sampling frequency as a second sampling frequency. After the down-conversion, the second sampling frequency is designed to be 1/m of the first sampling frequency. In this embodiment, the divisor m is 2, meaning that the frequency is reduced to a half, and the down-converted audio signal V3 generated has n/2 samples within a unit time.

In this embodiment, the first sampling frequency is 48 KHz, and the second sampling frequency after down-conversion is consequently 24 KHz. Meanwhile, the down-converting process subtracts m−1 samples from each m samples among the n samples. For example, by substituting m with 2, one sample is subtracted from each two samples. While the original n is 1024, new sampling of n/m samples is reduced to 512 samples within a unit time. Therefore, the number of samples and a sampling rate during the Fourier transform operation for speech enhancement are also reduced to a half. But the frequency resolution is corresponding to the number of samples in a unit of frequency range is unchanged. As a result, a same frequency resolution of frequency range as that of the original signal is preserved although having undergone the down-conversion and sampling frequency reduction.

At step S13, a speech enhancement processor 34 is adopted to perform speech enhancement on the down-converted audio signal V3 to generate a speech-enhanced audio signal V4. In this embodiment, the speech enhancement performed by the speech enhancement processor 34 is a known prior art. For instance, a spectral subtraction approach is used in the speech enhancement to process the input down-converted audio signal V3. For such an approach, at the previous step of down-conversion, the computing resource of the speech enhancement processor 34 and the demand on the system memory 23 are reduced to a half thereby addressing the drawbacks of memory resource depletion and processor operation efficiency wastage.

Further, the sampling frequency of the down-converted audio signal V3 is unchanged after being processed by speech enhancement, and so the speech-enhanced audio signal V4 output has the same sampling frequency as that of the down-converted audio signal V3. In order to accurately output the processed speech-enhanced audio signal V4 added to the left-channel and right-channel audio signals containing speech and background noises, the speech-enhanced audio signal V4 undergoes corresponding up-conversion and low-pass filtering at step S14. An up-converter 35 is used to up-convert the speech-enhanced audio signal V4 to generate an up-converted audio signal V5. Due to the prior sampling frequency reduction to a half in this embodiment, the up-conversion correspondingly doubles the sampling frequency of the signal, such that the sampling rate of the up-converted audio signal V5 is the first sampling frequency, while the up-converted audio signal V5 has n samples within a unit time.

In this embodiment, by substituting m with two, the second sampling frequency of 24 KHz of the speech-enhanced audio signal V4 is up-converted by double to become the first sampling frequency of 48 KHz of the up-converted audio signal V5. Meanwhile, between every two samples, the up-conversion interpolates m−1 samples with a value of zero to provide the original n samples. That is, one sample is interpolated between every two samples of the reduced 512 samples to yield the original 1024 samples, thereby completing up-conversion by way of the interpolated sampling.

The method continues by using a second low-pass filter 36 for performing second low-pass filtering on the up-converted audio signal V5 to generate a speech-enhanced and high-frequency-band-filtered audio signal V6. The second low-pass filter 36 according to this embodiment may be accomplished using the same half-band filter as the first low-pass filter 32. The speech-enhanced and high-frequency-filtered audio signal V6 generated has the original n samples, which are 1024 samples according to this embodiment as in step S14.

Figure 7A:
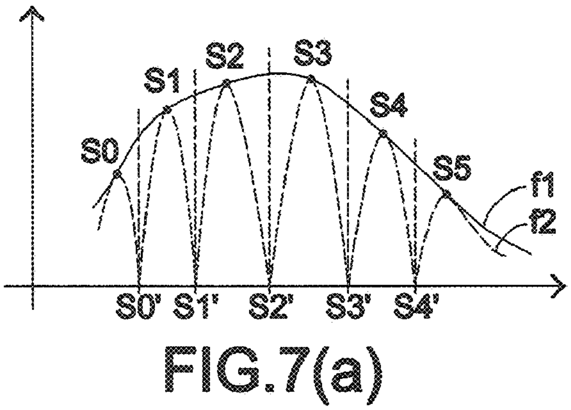
FIGS. 7(*a*) to 7(*c*) show schematic diagrams of interpolation sampling and high-frequency filtering in up-conversion.
Figure 7B:
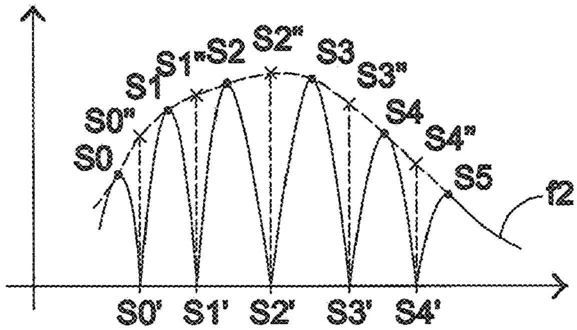
Figure 7C:
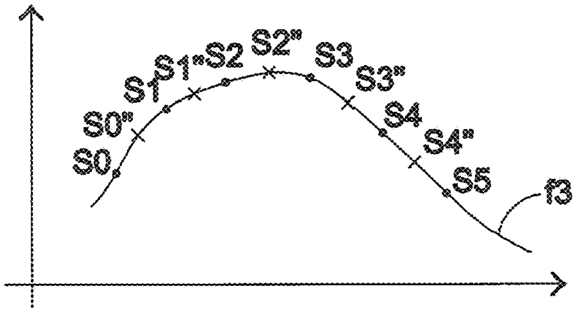

FIGS. 7(*a*) to 7(*c*) show schematic diagrams of the foregoing up-conversion and the second low-pass filtering using interpolated sampling. As shown, a curve f1 represents a low sampling frequency having six samples S0 to S5, and a curve f2 represents a high sampling frequency. To increase the sampling frequency, samples S0' to S4' having a value of zero are interpolated between every two samples at the curve f1, so as to form the curve f2 as shown in FIG. 7(*a*). Interpolated samples S0" to S4" shown in FIG. 7(*b*) are sequentially obtained via operations of the second low-pass filter 36. By combining the samples S) to S5 with S0" to S4", a curve f3 representing the original sampling frequency as the first sampling frequency is restored.

At step S15 of FIG. 5 according to this embodiment, a gain controller 37 is provided for controlling and adjusting gain of the speech-enhanced and high-frequency-band-filtered audio signal V6. For example, the gain controller 37 adjusts the speech-enhanced and high-frequency-band-filtered audio signal V6 by either amplification or reduction. Signal enhancement in form of amplification using the gain controller 37 is a type of positive signal gain, which controls an amplification ratio on speech to be added back in order to intensify speech enhancement results.

A final step of the method is adding the processed signal back to the original signal. Because group delay results from the aforementioned filtering and speech enhancement operations, the first delay unit 311 and the second delay unit 312 are used to perform a first signal delay and a second signal delay on the left-channel audio signal and the right-channel audio signal, respectively. In this embodiment, the signal propagation delays are the same time in the left-channel and right-channel. A second mixer 302 and a third mixer 303 are adopted for performing first signal mixing and second signal mixing on the speech-enhanced and high-frequency-band-filtered audio signal V6 with the left-channel audio signal and the right-channel audio signal, respectively. That is, the speech-enhanced bands are added back to the left-channel and right-channel audio signals, respectively. Thus, output signals of required sound effects are generated to accomplish the aforesaid object at step S15.

Recapitulative from the above description, the left-channel and right-channel audio signals are first mixed to become a single audio signal, which is then processed so as to lower computing resource wastage and to reduce memory resource depletion. In addition, down-conversion is also performed to further decrease computing resource and system memory requirement in order to fortify the aforesaid effects. Without undesirably affecting background sounds behind the enhanced speech, energy of speech from the original output audio signals is successfully reinforced, thereby providing a solution for the abovementioned drawbacks of the prior art.

In the first embodiment of the invention, down-conversion by reducing the sampling frequency to a half and up-conversion by doubling the corresponding sampling frequency are used as an example. However, the sampling frequency may also be reduced to one-third, with the subsequent up-conversion multiplying the corresponding sampling frequency by three times. Or, the sampling frequency may be reduced to one-quarter, with the subsequent up-conversion multiplying the corresponding sampling frequency by four times. Thus, computing resource wastage and memory resource depletion are further lowered. To be more precise, the value of m according to the invention is substituted with a positive integer greater than one, e.g., two, three, four . . . for performing algorithmic operations of various extents. According to the invention, the values of m and n are positive integers. However, note that the greater the value of m gets, the larger the high-frequency band to be filtered becomes, and the band of speech may be affected. Therefore, a recommended maximum value of m is four under a possible practical algorithm condition.

Figure 8:
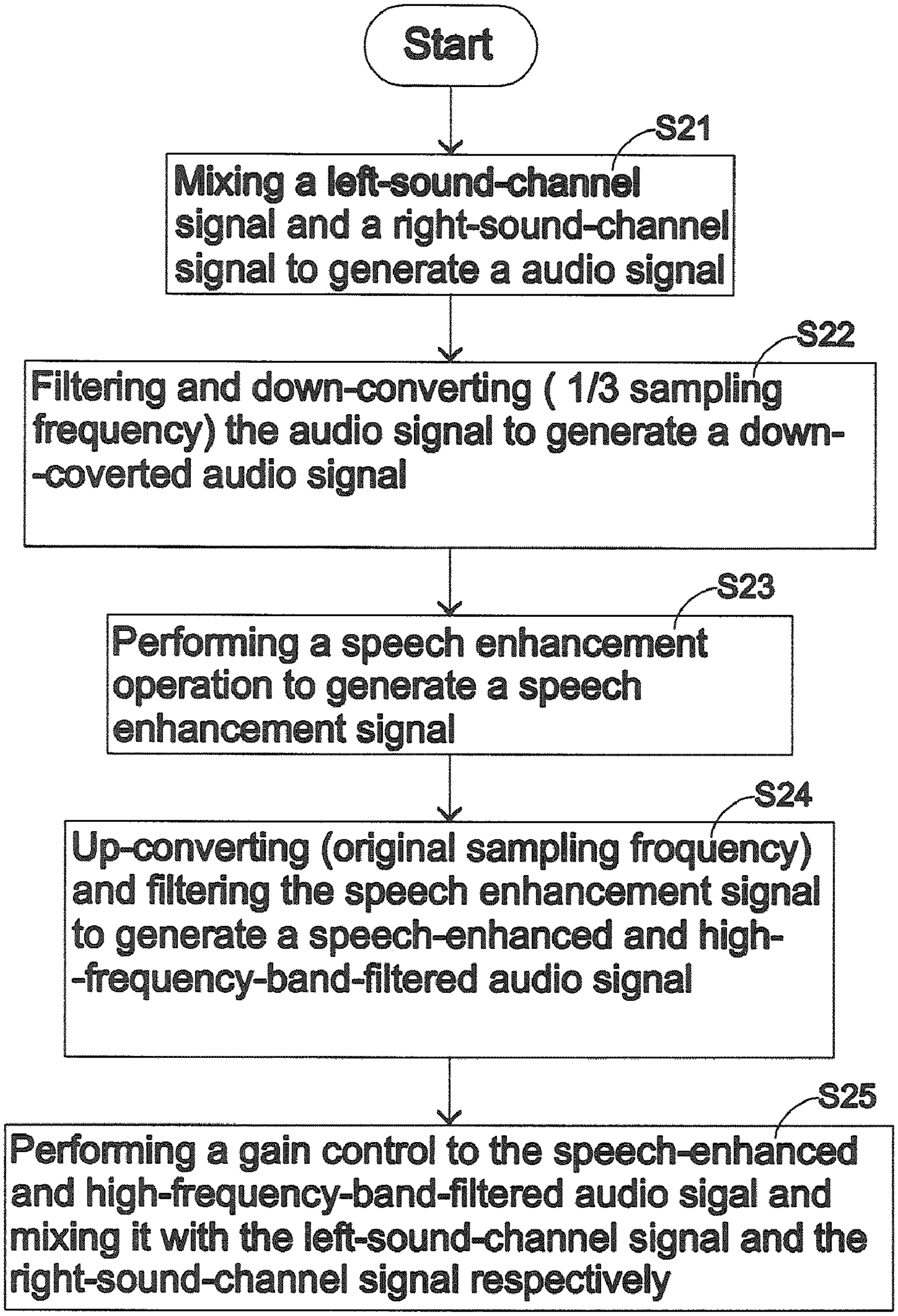
FIG. 8 shows a flow chart according to a second preferred embodiment of the invention.

According to the second embodiment of the invention, the sampling frequency to be signally processed is reduced to one-third, and is corresponding multiplied by three times in the up-conversion. Referring to a flow chart according to the second preferred embodiment in FIG. 8, steps S21, S23 and S25 are identical to steps S11, S13 and S15 of FIG. 5. Differences between the first and second preferred embodiments are that, down-conversion reduces the sampling frequency to one-third in step S22, and corresponding up-conversion multiplies the sampling frequency by three times in step S24.

Figure 9:
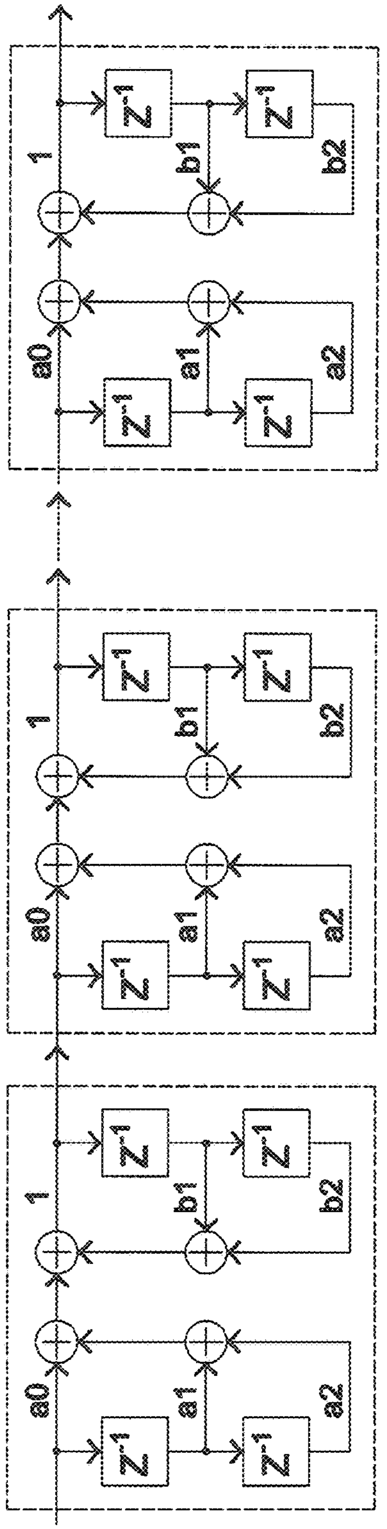
FIG. 9 shows a schematic diagram of an IIR cascade biquad filter.

Further, adjustment is made to the low-pass filter used. In the second preferred embodiment, a decimation filter or an interpolation filter primarily consisting of IIR cascade biquad filters is used to render preferred effects. FIG. 9 shows a schematic diagram of a decimation filter. In the diagram, the dotted lines define structures of the primary IIR cascade biquad filters, wherein coefficients a0 to a2, b1 and b2 are algorithmic coefficients. The decimation filters are implemented as the low-pass filters 32 and 36 in FIG. 4, thereby effectively accomplishing specified down-conversion and up-conversion according to the second preferred embodiment.

Therefore, conclusive from the above description, using speech enhancement according to the prior art, speech is enhanced among audio signals of an associated audio output interface. In conjunction with processes and structures of signal mixing, filtering and down-conversion according to the invention, processor operation efficiency wastage and memory resource depletion are lowered to effectively elevate performance of an entire system, thereby providing a solution to the abovementioned drawbacks of the prior art and achieving the primary objects of the invention.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A speech enhancement method for use in a speech enhancement device, comprising steps of:

receiving audio signals having a first sampling frequency;

down-converting the audio signals to generate down-converted audio signals having a second sampling frequency, wherein the second sampling frequency is less than the first sampling frequency;

performing speech enhancement on the down-converted audio signals to generate speech-enhanced audio signals; and up-converting the speech-enhanced audio signals to generate up-converted audio signals having a sampling frequency as the first frequency.

2. The speech enhancement method as claimed in claim 1, further comprising steps of:

performing a first signal mixing process on left-channel audio signals with right-channel audio signals to generate the audio signals; and performing a second signal mixing process on the up-converted audio signals with the left-channel audio signals to generate left-channel output audio signals and a third signal mixing process on the up-converted audio signals with the right-channel audio signals to generate right-channel output audio signals.

3. The speech enhancement method as claimed in claim 2, wherein the step of performing a second signal mixing process and a third signal mixing process further comprise a step of:

performing first delay and second delay on the left-channel audio signals and the right-channel audio signals respectively before performing the second signal mixing process and the third signal mixing process.

4. The speech enhancement method as claimed in claim 2, further comprising a step of:

performing gain control on the up-converted audio signals.

5. The speech enhancement method as claimed in claim 1, further comprising steps of:

before the down-converting step, performing first low-pass filtering on the audio signals; and after the up-converting step, performing second low-pass filter on the up-converted audio signals.

6. A speech enhancement method for use in a speech enhancement device, comprising steps of:

performing a first signal mixing process on left-channel audio signals with right-channel audio signals to generate audio signals;

performing speech enhancement on the audio signals to generate speech-enhanced signals; and performing a second signal mixing process on the speech-enhanced signals with the left-channel audio signals to generate left-channel output audio signals and a third signal mixing process on the speech-enhanced signals with the right-channel audio signals to generate right-channel output audio signals.

7. A speech enhancement device, comprising:

a down-converter, for down-converting audio signals having a first sampling frequency to generate down-converted audio signals having a second sampling frequency, wherein the second sampling frequency is less than the first sampling frequency;

a speech enhancement processor, coupled to the down-converter, for performing speech enhancement on the down-converted audio signals to generate speech-enhanced audio signals; and an up-converter, coupled to the speech enhancement processor, for up-converting the speech-enhanced audio signals to generate up-converted audio signals having a sampling frequency as the first sampling frequency.

8. The speech enhancement device as claimed in claim 7, further comprising:

a first mixer, coupled to the down-converter for performing a first signal mixing process on left-channel audio signals with right-channel audio signals to generate the audio signals;

a second mixer, coupled to the up-converter for performing a second signal mixing process on the up-converted audio signal with the left-channel audio signals to generate left-channel output audio signals; and a third mixer, coupled to the up-converter for performing a third signal mixing process on the up-converted audio signals with the right-channel audio signals to generate left-channel output audio signals.

9. The speech enhancement device as claimed in claim 8, further comprising:

a first delay unit, coupled to the second mixer for performing a first delay on the left-channel audio signals and outputting the left-channel delayed audio signals to the second mixer; and a second delay unit, coupled to the third mixer for performing a second delay on the right-channel audio signals and outputting the right-channel delayed audio signals to the second mixer.

10. The speech enhancement device as claimed in claim 8, further comprising a gain controller for performing a gain control on the up-converted audio signals, and further outputting the up-converted signals to the second mixer and the third mixer.

11. The speech enhancement device as claimed in claim 7, further comprising:

a first low-pass filter, coupled to the down-converter for performing a first low-pass filtering on the audio signals inputted to the down-converter; and a second low-pass filter, coupled to the up-converter for performing a second low-pass filtering on the up-converted audio signals outputted from the up-converter.

12. A speech enhancement device, comprising:

a first mixer, for performing a first signal mixing process on left-channel audio signals with right-channel audio signals to generate audio signals;

a speech enhancement processor, coupled to the first mixer for performing speech enhancement on the audio signals to generate speech-enhanced audio signals;

a second mixer coupled to the speech enhancement processor for performing a second signal mixing process on the speech-enhanced audio signals with the left-channel audio signals to generate left-channel output signals; and a third mixer, coupled to the speech enhancement processor for performing a third signal mixing process on the speech-enhanced audio signals with the right-channel audio signals to generate right-channel output signals.

* * * * *